United States Patent [19]

Nishimoto et al.

[11] Patent Number: 4,911,979

[45] Date of Patent: Mar. 27, 1990

[54] HEAT-SHRINKABLE LAMINATED FILM AND PROCESS FOR PRODUCING THE SAME

[75] Inventors: Yoshiharu Nishimoto; Kengo Yamazaki, both of Iwaki; Tooru Oosugi, Niihari, all of Japan

[73] Assignee: Kureha Kagaku Kogyo Kabushiki Kaisha, Tokyo, Japan

[21] Appl. No.: 148,569

[22] Filed: Jan. 26, 1988

[30] Foreign Application Priority Data

Feb. 5, 1987 [JP] Japan ................................... 62-25237
Dec. 7, 1987 [JP] Japan ................................. 62-309210

[51] Int. Cl.$^4$ ........................................... B23B 27/08
[52] U.S. Cl. ..................................... 428/332; 428/367; 428/476.3; 428/476.9; 428/475.8; 428/475.2; 428/520; 156/244.11
[58] Field of Search ............... 428/476.3, 476.9, 475.8, 428/520, 36.7, 332, 475.2

[56] References Cited

U.S. PATENT DOCUMENTS

| | | | |
|---|---|---|---|
| 3,949,114 | 4/1976 | Viola et al. ....................... | 428/476.9 |
| 4,254,169 | 3/1981 | Schroeder ........................... | 428/520 |
| 4,347,332 | 8/1982 | Odorzyndki et al. ............. | 428/474.4 |
| 4,557,780 | 12/1985 | Newsome et al. ................ | 428/475.8 |
| 4,734,327 | 3/1988 | Vicik .................................. | 428/474.4 |
| 4,735,855 | 4/1988 | Wofford et al. .................. | 428/474.4 |
| 4,764,406 | 8/1988 | Hisazumi .......................... | 428/475.8 |

FOREIGN PATENT DOCUMENTS

| | | |
|---|---|---|
| 49279/85 | 11/1985 | Australia . |
| 0064330 | 4/1981 | European Pat. Off. . |
| 0132565 | 8/1983 | European Pat. Off. . |
| 0252597 | 4/1985 | European Pat. Off. . |
| 0216094 | 4/1987 | European Pat. Off. . |
| 0217609 | 6/1988 | European Pat. Off. . |
| 016576 | 7/1977 | Japan . |
| 1591424 | 6/1981 | United Kingdom . |

*Primary Examiner*—Edith Buffalow
*Attorney, Agent, or Firm*—Nixon & Vanderhye

[57] ABSTRACT

Disclosed herein is a heat-shrinkable laminated film comprising at least two layers of a mixed resin layer (A) consisting essentially of 65 to 85 wt % of a polyamide resin and 15 to 35 wt % of a saponified ethylene-vinyl acetate copolymer, and a layer (B) containing at least 55 wt % of a saponified ethylene-vinyl acetate copolymer, the thickness of said layer (A) being larger than that of said layer (B).

18 Claims, No Drawings

HEAT-SHRINKABLE LAMINATED FILM AND PROCESS FOR PRODUCING THE SAME

BACKGROUND OF THE INVENTION:

The present invention relates to a heat-shrinkable laminated film comprising a mixed resin layer (A) of a polyamide resin (hereinafter referred to as "Ny resin"-)and a saponified ethylene-vinyl acetate copolymer (hereinafter referred t as "EVOH resin") at a specific mixing ratio and a layer (B) containing an EVOH resin, the thickness of the layer (A) being larger than that of the layer (B), and a process for producing the heat-shrinkable laminated film. More particularly, the present invention relates to a heat-shrinkable laminated film comprising at least two layers of a mixed resin layer (A) consisting essentially of 65 to 85 wt% of an Ny resin and 15 to 35 wt% of an EVOH resin and a layer (B) containing at least 55 wt% of an EVOH resin, he thickness of the layer (A) being larger than that of the layer (B), and a process for producing the heat-shrinkable laminated film.

Most of fatty foods such as raw meats and processed meats have irregular shapes and are not uniform in size. For packaging such foods having various shapes a shrink-packaging method using heat-shrinkable films is industrially adopted. General procedures of this method comprises the steps of inserting an object into a bag of a film, removing the air from the bag under vacuum, sealing the opening of the bag, and heating the bag so as to heat-shrink the film, and conforming an closely contacting the film with the content, thereby obtaining a fine package. In this method, the heat-treatment also serves to sterilize the content and is ordinarily carried out at a temperature of 80° to 100° C.

A film used for such shrink packaging must be excellent in gas-barrier property and conformable adhesiveness, and be sufficiently shrunk when heated with hot water or hot air of 80° to 100° C.

As such a shrink-packaging film, an EVOH resin film having a high gas-barrier property is considered to be suitable. However, since an EVOH resin film having an excellent gas-barrier property is inferior in low-temperature stretchability, such resin cannot be said to be suitable for practical use.

To eliminate this defect, various methods have been proposed.

For example, a heat-shrinkable film having a mixed resin layer of an EVOH resin and a Ny resin [Japanese Patent Application Laid-Open (KOKAI) Nos. 54-16576 (1979) and 58-36412 (1983)], a heat-shrinkable laminated film composed of an EVOH resin layer and a Ny resin layer [Japanese Patent Application Laid-Open (KOKAI) No. 56-136365 (1981)], and a heat-shrinkable film comprising a mixed resin layer of an EVOH resin and a Ny resin, and a thermoplastic resin layer laminated on the mixed resin layer so as to provide a heat-sealing property [Japanese Patent Application Laid-Open (KOKAI) No. 56-15326 (1981)]have been proposed.

However, a film having a mixed resin layer of an EVOH resin and a Ny resin as the barrier layer has an insufficient gas-barrier property for the film required to have a high gas-barrier property, or when a higher stretching film-forming property is necessary, such a film cannot always be said to satisfy the stretching film-forming property.

Accordingly, a film having a layer containing an EVOH resin as the main constituent and showing both high gas-barrier property and excellent stretching film-forming property is now in demand.

As a result of the study by the present inventors in order to improve the stretching film-forming property of an EVOH resin while maintaining a high gas-barrier property, it has been found that a heat-shrinkable laminated film having both high gas-barrier property and excellent stretching film-forming property are obtained by laminating a layer containing an EVOH resin with a mixed resin layer of an EVOH resin an a Ny resin, and more particularly, by laminating a resin layer comprising an EVOH resin and a Ny resin at a specific mixing ratio and having a thickness larger than a layer containing an EVOH resin with the layer containing an EVOH resin and the thus obtained laminate is easy to orient. The present invention has been achieved on the basis of this finding.

SUMMARY OF THE INVENTION:

In a first aspect of the present invention, there is provided a heat-shrinkable laminated film comprising at least two layers of a mixed resin layer (A) consisting essentially of 65 to 85 wt% of a polyamide resin and 15 to 35 wt% of a saponified ethylene-vinyl acetate copolymer, and a layer (B) containing at least 55 wt% of a saponified ethylene-vinyl acetate copolymer, the thickness of said layer (A) being larger than that of said layer (B).

In a second aspect of the present invention, there is provided a process for producing a heat-shrinkable laminated film comprising laminating at least two layers of a mixed resin layer (A) consisting essentially of 65 to 85 wt% of a polyamide resin and 15 to 35 wt% of a saponified ethylene-vinyl acetate copolymer, and a layer (B) containing at least 55 wt% of a saponified ethylene-vinyl acetate copolymer in a circular die so that the thickness of said layer (A) is larger than that of said layer (B); coextruding the laminate into a tubular shape; and biaxially stretching the tubular laminate to 1.3 to 3. 5 times in the machine and transverse directions, respectively, while heating said laminate to 75° C. and not higher than 100° C.

DETAILED DESCRIPTION OF THE INVENTION:

A heat-shrinkable laminated film according to the present invention comprises at least two layers of a mixed resin layer (A) of 65 to 85 wt% of a Ny resin and 15 to 35 wt% of an EVOH resin, and a layer (B) containing at least 55 wt% of an EVOH resin, a thickness of the layer being larger than that of the layer (B).

An EVOH resin used for the layers (A) and (B) in the heat-shrinkable laminated film of the present invention is a resin of a partially saponified ethylene-vinyl acetate copolymer. The ethylene content in the EVOH resin is 25 to 49 mol%, preferably 30 to 45 mol%, and the saponification degree is not less than 95 mol%. If the ethylene content exceeds 49 mol,, the gas-barrier property is deteriorated, while if the ethylene content is less than 25 mol%, the stretching film-forming property becomes inferior.

The EVOH resins for the layers (A) and (B) may be either the same or different.

The crystalline melting point of the Ny resin is preferably not higher than 240° C. If the crystalline melting point of the Ny resin exceeds 240° C., when the resin is mixed with an EVOH resin, cross-linking reaction is apt to be produced during the extrusion of the mixed resin layer, thereby tending to produce a gel.

The crystalline melting point is a temperature which shows the maximum value of the melting point curve obtained by measuring with a temperature when elevating 8 mg of a sample at a rate of 8° C./min by using a differential scanning type calorimeter (Metler Ltd., TA-3000).

As the Ny resin used in the present invention, nylon 6, nylon 11, nylon 12, nylon 6,9, nylon ,10, nylon 6,12 , nylon 6-12, nylon 6-66, etc. are preferable. Among these, nylon 6-66 is most preferable.

The layer (A) composed of a mixed resin of 65 to 85 wt% of a N resin and 15 to 35 wt% of an EVOH resin, preferably a mixed resin of 70 to 80 wt% of a Ny resin and 20 to 30 wt% of an EVOH resin. If the Ny resin exceeds 85 wt%, the stretching film-forming property is deteriorated (the inner pressure of the tubular film is raised during inflation or the slipperiness between the dimension guide roll and the film is deteriorated, resulting in nonuniformity in the film width). If the Ny resin is less than 65 wt%, necking is apt to be produced and the stretching film-forming property is deteriorated, resulting in an inferior external appearance of the film.

The layer (B) comprises a resin containing at least 55 wt% of an EVOH resin. The layer (B) may be either a layer of an EVOH resin solely, or a layer composed of not less than 55 wt% and less than 100 wt% of an EVOH resin and more than 0 and not more than 45 wt% of at least one resin selected from the group consisting of elastomers such as a polyester elastomer (e.g., a block copolymer-type thermoplastic polyester elastomer) and a polyamide elastomer (a polyester amide elastomer and a polyether amide elastomer), an polyolefin resin such as an ethylene-vinyl acetate copolymer, a saponified ethylene-vinyl acetate copolymer (having a saponification degree of less than 95%) and a polyamide resin which is mixed with the EVOH resin so as to improve the stretching film-forming property, the low-temperature resistance and the flexibility. As such a polyamide resin, nylon 6, nylon 11, nylon 12, nylon 6,9, nylon 6,10, nylon 6,12 and a copolyamide resin: nylon 6-12, and nylon 6-66 are exemplified. As the resin mixed with the EVOH resin, a polyamide resin or a polyester elastomer is preferable. If the EVOH resin is less than 55 wt%, the gas-barrier property is unfavorably insufficient.

A heat-shrinkable laminated film of the present invention comprises at least the layer (A) and the layer (B), and the numbers of the layers (A) and (B) each may be two or more. When the layers (A) and (B) constituting the laminated film are respectively two or more, the resin composition of each layer may be either the same or different. However, in view of workability, it is preferable that the laminated film comprises one layer (A) and one layer (B).

It is necessary that the thickness of the layer (A) is larger than that of the layer (B) in the laminated film of the present invention. If the layers (A) and (B) constituting the laminated film are respectively two or more, it is necessary that the total thickness of the layers (A) is larger than the total thickness of the layers (B). If the thickness of the layer (A) is smaller than that of the layer (B), the stretching property of the film is deteriorated. The thickness of the layer (A) is preferably 1.2 to 3 times as large as that of the layer (B).

The laminated film of the present invention requires at least two layers of the layer (A) and the layer (B), and it is possible to laminate another thermoplastic resin layer thereon in order to provide the film with various properties. As the thermoplastic resin, an olefin resin is preferable in view of the extrusion property, stretching film-forming property and sealing property.

As the olefin resin are preferable a copolymer of ethylene and a vinyl ester monomer such as an ethylene-vinyl acetate copolymer (hereinafter referred to as "EVA"); a copolymer of ethylene and a monomer selected from the group consisting of an aliphatic unsaturated carboxylic acid and an aliphatic unsaturated carboxylate, e.g., a copolymer of ethylene and a monomer selected from the group consisting of acrylic acid, acrylate, methacrylic acid and methacrylate; an ionomer resin; a mixed resin of a linear low-density polyethylene (hereinafter referred to as "LLDPE") and an EVA; a very low-density polyethylene having a density of not more than 0.91 and a Vicat softening point (measured by ASTM D-1525) of not more than 90° C., preferably not more than 80° C. (hereinafter referred to as "VLDPE"); and a mixed resin of VLDPE and a small amount of LLDPE. As the EVA, those containing 3 to 19 wt% of vinyl acetate are preferable. In a mixed resin of an LLDPE and an EVA, the content of the EVA is preferably at least 55 wt% from the viewpoint of the stretching film-forming property. As the LLDPE, a copolymer of ethylene with a small amount of an α-olefin having 4 to 18 carbon atoms such as butene-1, penten-1, 4-methyl-penten-1, hexene-1 and octene-1, which has a crystalline melting point of 118° C. to 130° C is preferable. As the ionomer resin, an ion cross-linked polymer is obtained by neutralizing a part of the anions of a copolymer of an α-olefin such as ethylene and propylene with a partially saponified polymer of an unsaturated carboxylic acid or unsaturated carboxylate such as acrylic acid, methacrylic acid and maleic acid, with metal ions such as $Na^+$, $K^+$, $Mg^{2+}$, $Ca^{2+}$ and $Zn^{2+}$. As the metal ions, $Na^+$ and $Zn^{2+}$ are generally used. An ionomer resin partially neutralized with bivalent metal ions and containing a Ny oligomer is also usable. An EVA containing 5 to 9 wt% of vinyl acetate and an ionomer resin are most preferable in view of the extrusion property and the stretching film-forming property.

In a laminated film of the present invention, at least one olefin layer can be laminated. If it has two olefin resin layers or more, the olefin resin layers may be the same or different. The olefin resin layer may be disposed either between the layer (A) and the layer (B), or preferably on one side or both sides of the laminated film of the layers (A) and (B). By laminating the olefin resin layer, it is possible to improve the extrusion property and the stretching film-forming property, and to provide the laminated film with an excellent sealing property. It is possible to add an inorganic additive and/or an organic additive such as a thermoplastic resin, an inorganic filler and a pigment to the layer (A), the layer (B) and the olefin resin layer in such a quantity as not to impair the stretching film-forming property and the gas-barrier property.

Since the adhesiveness between the layer (A) and the layer (B) is good, no particular adhesive layer is required, but an adhesive layer may be provided, if necessary. In this case, the adhesive layer is preferably disposed between the olefin resin layer and the layer (A) or the layer (B) so as to improve the adhesiveness.

As the adhesive, a polyolefin which is modified or polymerized with a carboxylic acid such as fumaric acid and maleic acid is preferable. As examples of the polyolefin, a homopolymer of an olefin such as ethylene and propylene, a copolymer such as an ethylene-vinyl acetate copolymer, an ethylene-acrylate copolymer and an ethylene-methacrylate copolymer, and a mixture thereof which do not impair the transparency are exemplified.

A process for producing a heat-shrinkable laminated film according to the present invention will be described.

A laminate of the layer (A) and the layer (B) is coextruded into a tubular shape so that the thickness of the layer(s) (A) is larger than that of the layer(s) (B) by using a circular die equipped with the same number of extruders as the number of the laminated layers. The thus coextruded tubular laminate is immediately rapidly cooled, and the thus obtained substantially amorphous tubular film is heated. The thus heated film is biaxially stretched to 1.3 to 3.5 times, preferably 1.5 to 3 times in the machine and transverse directions, respectively, by an inflation method, thereby producing a heat-shrinkable film. The heating temperature of the substantially amorphous tubular film is not lower than 75° C. and lower than 100° C., preferably 85 to 95° C. If the heating temperature is lower than 75° C., the stretching film-forming property is deteriorated. On the other hand, if the heating temperature is 100° C. or higher, it is impossible to obtain the desired heat-shrinkage. It is necessary that a heat-shrinkable film of the present invention has a thermal-shrinkage of not less than 10%, preferably not less than 15% in both machine and transverse directions when the film is immersed in a hot water of 98° C. for 1 minute. If the thermal-shrinkage is less than 10%, a wrinkle of the film may be produced on the surface of a package or the close contact between the content and the packaging film is impaired, thereby deteriorating the external appearance of the goods.

A heat-shrinkable laminated film of the present invention consisting of the layer (A) and the layer (B) preferably has a thickness of not more than 30 $\mu$m in view of flexibility, and a thickness which restricts the gas permeability to not more than 150 cc/m$^2$·day·atm. A heat-shrinkable film of the present invention comprising the layer (A), the layer (B) and a thermoplastic resin layer preferably has a thickness of 15 to 120 $\mu$m, and a thickness which restricts the gas permeability to not more than 150 cc/m$^2$·day·atm, the total thickness of the layer (A) and the layer (B) being not more than 30 $\mu$m, so as to provide the film flexibility.

A heat-shrinkable laminated film of the present invention, which is produced by laminating a layer containing an EVOH resin layer which has a high gas-barrier property on a mixed resin layer of an EVOH resin and a Ny resin which has a relatively high gas-barrier property and good stretching film-forming property in a specific layer-thickness ratio, is a good food packaging film having both high O$_2$ gas-barrier property and excellent stretching film-forming property.

Since the stretching film-forming property is excellent, it is possible to greatly reduce the dimensional change of the film with time without the need for excessive orientation and the film does not occur any ply separation during a high-temperature treatment in a sterilization and heat shrinkage process. A heat-shrinkable laminated film of the present invention also has a good property of clinging to an article in comformity therewith.

The present invention will be explained more in detail while referring to the following non-limitative examples.

EXAMPLES 1 TO 11, COMPARATIVE EXAMPLES 1 TO 6

Resins shown in Table 1 were separately charged into a circular die by a plurality of extruders, and the laminates having the layer-structures shown in Table 2 were coextruded. Each of the tubular laminates extruded from the die was cooled in a cooling bath of 5 to 20° C., to obtain a substantially amorphous tubular laminate 200 mm in folded width and 60 to 200 $\mu$m in thickness. In a heating bath adjusted to the temperature shown in Table 2, the thus obtained tubular laminate was heated for about 6 seconds while feeding to the heating bath at a rate of 20 m/min, and the thus heated tubular laminate was passed through nip rolls of a rotational rate of 20 m/min. The heated tubular laminate was stretched to 2 times in the machine direction (L) at room temperature and stretched in the transverse direction (T) by expanding it 2 times the diameter of the tubular laminate by the air supplied into the tubular laminate by the time the laminate was passed through second nip rolls of a rotational rate of 40 m/min. The thus obtained biaxially oriented film was about 385 mm in folded width and 5 to 50 $\mu$m in thickness.

The kinds and physical properties of the resins used in Examples are shown in Table 1, the layer-structures of the laminated films obtained and the results of the tests on the properties of the films are shown in Table 2, and the methods for the tests on the properties are shown in Table 3.

EXAMPLE 12

Resins shown in Table 1 were separately charged into a circular die by a plurality of extruders, and the laminate having the layer-structures shown in Table 2 was coextruded. the tubular laminate extruded from the die was cooled in a cooling bath of 5 to 20° C., to obtain a substantially amorphous tubular laminate 262 mm in folded width and 95 $\mu$m in thickness. In a heating bath adjusted to the temperature shown in Table 2, the thus obtained tubular laminate was heated for about 6 seconds while feeding to the heating bath at a rate of 27 m/min, and the thus heated tubular laminate was passed through nip rolls of a rotational rate of 27 m/min. The heated tubular laminate was stretched to 1.5 times in the machine direction (L) at room temperature and stretched in the transverse direction (T) by expanding it 1.5 times the diameter of the tubular laminate by the air supplied into the tubular laminate by the time the laminate was passed through second nip rolls of a rotational rate of 40 m/min. The thus-obtained biaxially oriented film was about 385 mm in folded width and 42 $\mu$m in thickness.

The kinds and physical properties of the resins used in Example 12 are shown in Table 1, the layer-structures of the laminate film obtained and the results of the tests on the properties of the film are shown in Table 2, and the methods for the tests on the properties are shown in Table 3.

EXAMPLE 13

Resins shown in Table 1 were separately charged into a circular die by a plurality of extruders, and the laminate having the layer-structures shown in Table 2 was coextruded. The tubular laminate extruded from the die was cooled in a cooling bath of 5 to 20° C., to obtain a substantially amorphous tubular laminate 133 mm in folded width and 378 μm in thickness. In a heating bath adjusted to the temperature shown in Table 2, the thus obtained tubular film was heated for about 6 seconds while feeding to the heating bath at a rate of 13 m/min, and the thus heated tubular laminate was passed through nip rolls of a rotational rate of 13 m/min. The heated tubular laminate was stretched to 3 times in the machine direction (L) at room temperature and stretched in the transverse direction (T) by expanding it 3 times the diameter of the tubular laminate by the air supplied into the tubular laminate by the time the laminate was passed through second nip rolls of a rotational rate of 40 m/min. The thus-obtained biaxially oriented film was about 385 mm in folded width and 42 μm in thickness.

The kinds and physical properties of the resins used in Example 13 are shown in Table 1, the layer-structures of the laminated film obtained and the results of the tests on the properties of the film are shown in Table 2, and the methods for the tests on the properties are shown in Table 3.

TABLE 1

| Resin | Abbreviation | Physical properties |
|---|---|---|
| Nylon 6-66 copolymer | $Ny^1$ | crystalline melting point (Tm); 200° C. |
| Nylon 6-12 copolymer | $Ny^2$ | crystalline melting point (Tm): 130° C. |
| Saponified ethylene-vinyl acetate copolymer | EVOH | saponification degree: 98%, crystalline melting point (Tm): 164° C., ethylene content: 44 mol % |
| Modified saponified ethylene-vinyl acetate | Mod. (EVOH) | blending of EVOH and a polyester elastomer, Nihon Gosei Kagaku K.K. Soanol STS improved |
| Mixture of ionomer/ nylon oligomer | IO/PA | metal ion: $Zn^{++}$, Mitsui Du Pont, Himilan |
| Ionomer | IO | crystalline melting point (Tm): 98° C., metal ion: $Na^+$, Mitsui Du Pont, Himilan |
| Very low-degree polyethylene | VLDPE | crystalline melting point (Tm): 115° C., density: 0.900, Sumitomo Kagaku Kogyo K.K., Excelene, Vicat softening point: 75° C. |
| Ethylene-α-olefin copolymer | LLDPE | crystalline melting point (Tm): 120° C., Mitsui Sekiyu Kagaku K.K., Ultzex |
| Ethylene-vinyl acetate copolymer | EVA | vinyl acetate content: 5 wt %, crystalline melting point (Tm): 102° C. |
| Carboxylic acid modified ethylene-ethylacrylate | $EEA^{gCOOH}$ | crystalline melting point (Tm): 110° C., blended system containing 15 wt % of ethyl-acrylate |
| Ethylene-acrylate based tricopolymer | EEA-MAH | crystalline melting point (Tm): 95° C., Sumitomo Kagaku K.K., Bondine |

TABLE 2

| Examples & Comparative Examples | Layer-structure (mixing weight ratio and thickness of layers: μm) | Stretching ratio | Heating temperature (°C.) | Stretchability | Thermal shrinkage (L/T %) | Dimensional stability | Gas-barrier property (cc.m² · day · atm) |
|---|---|---|---|---|---|---|---|
| Example 1 | [$Ny^1$/EVOH(7/3)]/EVOH<br>(10) (5) | 2 × 2 | 80 | A | 26/31 | B | 139 |
| Example 2 | [$Ny^1$/EVOH(8/2)]/[$Ny^1$/EVOH(7/3)]/<br>(10) (10)<br>[$Ny^1$/EVOH(8/2)]<br>(10) | 2 × 2 | 80 | A | 29/33 | B | 66 |
| Example 3 | [$Ny^1$/EVOH(65/35)]/$EEA^{gCOOH}$/EVOH/<br>(12) (1) (6)<br>$EEA^{gCOOH}$/[LLDPE/EVA(3/7)]<br>(1) (20) | 2 × 2 | 95 | B | 22/23 | B | 110 |
| Example 4 | [$Ny^1$/EVOH(8/2)]/[EVOH/$EEA^{gCOOH}$/<br>(12) (1) (1)<br>IO<br>(20) | 2 × 2 | 85 | A | 24/28 | A | 105 |
| Example 5 | [LLDPE/EVA(3/7)]/$EEA^{gCOOH}$/EVOH/<br>(5) (1) (10)<br>[$Ny^1$/EVOH(8/2)]/$EEA^{gCOOH}$/IO<br>(12) (1) (20) | 2 × 2 | 95 | A | 27/28 | A | 77 |
| Example 6 | EVA/EEA-MAH/EVOH/]$Ny^1$/EVOH(7/3)]/<br>(5) (1) (6) (8)<br>EEA-MAH/IO<br>(1) (25) | 2 × 2 | 95 | A | 26/28 | A | 124 |
| Example 7 | [$Ny^1$/EVOH(85/15)]/EVOH/$EEA^{gCOOH}$/<br>(8) (6) (1)<br>IO<br>(20) | 2 × 2 | 90 | B | 28/29 | A | 134 |
| Example 8 | EVA/EEA-MAH/Mod.EVOH/[$Ny^1$/<br>(4) (1) (6)<br>EVOH(7/3)]/EEA-MAH/IO<br>(8) (1) (22) | 2 × 2 | 95 | A | 28/29 | A | 117 |
| Example 9 | EVA/$EEA^{gCOOH}$/Mod.EVOH/[$Ny^1$/<br>(4) (1) (5)<br>EVOH(8/2)]/$EEA^{gCOOH}$/VLDPE<br>(9) (1) (22) | 2 × 2 | 95 | A | 27/29 | A | 135 |

TABLE 2-continued

| Examples & Comparative Examples | Layer-structure (mixing weight ratio and thickness of layers: μm | Stretching ratio | Heating temperature (°C.) | Stretchability | Thermal shrinkage (L/T %) | Dimensional stability | Gas-barrier property (cc.m². day · atm |
|---|---|---|---|---|---|---|---|
| Example 10 | EVA/EEA$^{gCOOH}$/Mod.EVOH/[Ny$^1$/<br>(4)  (1)         (5)<br>EVOH(8/2)]/EEA$^{gCOOH}$/[VLDPE/LLDPE(9/1)]<br>(9)              (1)              (22) | 2 × 2 | 95 | A | 28/28 | A | 138 |
| Example 11 | EVA/EEA$^{gCOOH}$/Mod.EVOH/[Ny$^1$/<br>(4)  (1)         (5)<br>EVOH(8/2)]/EEA$^{gCOOH}$/(IO/PA)<br>(9)              (1)              (22) | 2 × 2 | 95 | A | 26/29 | A | 136 |
| Example 12 | EVA/EEA-MAH/Mod.EVOH/[Ny$^2$/<br>(4)  (1)         (6)<br>EVOH(7/3)]/EEA-MAH/IO<br>(8)              (1)              (22) | 1.5 × 1.5 | 95 | A | 22/26 | A | 120 |
| Example 13 | EVA/EEA-MAH/Mod.EVOH/[Ny$^2$/<br>(4)  (1)         (6)<br>EVOH(7/3)]/EEA-MAH/IO<br>(8)              (1)              (22) | 3 × 3 | 95 | A | 35/35 | A | 112 |
| Comparative Example 1 | Ny$^1$/EVOH/Ny$^1$<br>(10) (10)    (10) | 2 × 2 | 80 | C | 28/32 | D | 95 |
| Comparative Example 2 | [Ny$^1$/EVOH(7/3)]/EEA$^{gCOOH}$/EVOH/<br>(12)              (1)           (6)<br>EEA$^{gCOOH}$/[LLDPE/EVA(3/7)]<br>(1)            (20) | 2 × 2 | 95 | C | 30/36 | D | 132 |
| Comparative Example 3 | [Ny$^1$/EVOH(8/2)]/EEA$^{gCOOH}$/EVOH/<br>(6)              (1)           (8)<br>EEA$^{gCOOH}$/IO<br>(1)            (20) | 2 × 2 | 95 | C | 31/35 | C | 101 |
| Comparative Example 4 | [Ny$^1$/EVOH(65/35)]/EVA<br>(30)                  (15) | 2 × 2 | 95 | B | 32/33 | C | 175 |
| Comparative Example 5 | [Ny$^1$/EVOH(6/4)]/EEA$^{gCOOH}$/IO<br>(15)         (1)          (20) | 2 × 2 | 95 | C | 30/31 | C | 165 |
| Comparative Example 6 | [Ny$^1$/EVOH(3/7)]/IO<br>(10)                (20) | 2 × 2 | — | D | — | — | — |

TABLE 3

| | Property | Method for testing the property |
|---|---|---|
| 1. | Thermal-shrinkage | 20 pieces of 10 cm × 10 cm film were immersed into a hot bath of 98° C. in a loose state. The heat-shrinkage was represented by the average value of the ratios of the longitudinal and transverse lengths of the films to the respective original lengths. |
| 2. | Stretchability | A: Very good.<br>B: Good.<br>C: Stretchable but impracticable due to the production of a small necking and nonuniformity in film thickness.<br>D: Difficult to stretch. |
| 3. | Gas-barrier property | Represented by the amount of oxygen transmitted through the film at 30° C. and 100% RH. A high gas-barrier film is required to have a value of not more than 150 cc/m². day · atm. |
| 4. | Dimensional stability | The dimensional change of a stretched film of about 1 m long left to stand at 23° C. and 50% RH for 2 weeks was measured.<br>A: Less than 5% (Practicable).<br>B: Not less than 5 and less than 8% (Practicable).<br>C: 8 to 10% (Impracticable).<br>D: More than 10% (Impracticable). |

What is claimed is:

1. A heat-shrinkable laminated film having a heat shrinkage of not less than 10% in both machine and transverse direction at 98° C. in hot water, said laminated film comprising
   at least two layers of a mixed resin layer (A) consisting essentially of 65 to 85 wt% of a polyamide resin and 15 to 35 wt% of a saponified ethylene-vinyl acetate copolymer, and
   a layer (B) containing at least 55 wt% of a saponified ethylene-vinyl acetate copolymer,
   the thickness of said layer (A) being larger than that of said layer (B), provided that when a thermoplastic resin layer is laminated thereon, a polyamide resin is not used as the thermoplastic layer.

2. A heat-shrinkable laminated film according to claim 1 having a heat shrinkage of not less than 10% in both machine and transverse directions at 98° C. in hot water, said laminated film consisting of two layers of a mixed resin layer (A) consisting essentially of 65 to 85 wt% of a polyamide resin and 15 to 35 wt% of a saponified ethylene-vinyl acetate copolymer, and a layer (B) containing at least 55 wt% of a saponified ethylene-vinyl acetate copolymer the thickness of said layer (A) being larger than that of said layer (B).

3. A heat-shrinkable laminated film according to claim 1, having a heat shrinkage of not less than 10% in both machine and transverse directions at 98° C. in hot water, said laminated film consisting of four layers of a mixed resin layer (A) consisting essentially of 65 to 85 wt% of a polyamide resin and 15 to 35 wt% of a saponified ethylene-vinyl acetate copolymer, and one olefin resin layer disposed on the outer surface of layer (A) or layer (B) interposing an adhesive layer therebetween, the thickness of said layer (A) being larger than that of said layer (B).

4. A heat-shrinkable laminated film according to claim 1 having a shrinkage of not less than 10% in both machine and transverse directions at 98° C. in hot water, said laminated film consisting of six layers of a mixed resin layer (A) consisting essentially of 65 to 85 wt% of a polyamide resin and 15 to 35 wt% of a saponified ethylene-vinyl acetate copolymer, a layer (B) containing at least 55 wt% of a saponified ethylene-vinyl acetate copolymer, and two olefin resin layers disposed on both outer surfaces of the laminate film of layer (A) and layer (B) interposing adhesive layers therebetween, the thickness of said layer (A) being larger than that of said layer (B).

5. A heat-shrinkable laminated film according to claim 1 having a heat shrinkage of not less than 10% in both machine and transverse directions at 98° C. in hot water, said laminated film consisting of three layers, two of mixed resin layers (A) consisting essentially of 65 to 85 wt% of a polyamide resin and 15 to 35 wt% of a saponified ethylene-vinyl acetate copolymer, and a layer (B) containing at least 55 wt% of a saponified ethylene-vinyl acetate copolymer disposed between the two (A) layers, the total thickness of both of said (A) layers being larger than that of said layer (B).

6. A hat-shrinkable laminated film according to claim 1 having a heat shrinkage of not less than 10% in both machine and transverse directions at 98° C. in hot water, consisting of five layers, two of mixed resin layers (A) consisting essentially of 65 to 85 wt% of a polyamide resin and 15 to 35 wt% of a saponified ethylene-vinyl acetate copolymer, a layer (B) containing at least 55 wt% of a saponified ethylene-vinyl acetate copolymer disposed between two layers (A), and one olefin resin layer disposed on the surfaces of the layer (A) interposing an adhesive layer therebetween, the total thickness of said layers (A) being larger than that of said layer (B).

7. A heat-shrinkable laminated film according to claim 1 having heat shrinkage of not less than 10% in both machine and transverse directions at $v$° C. in hot water, said laminated film consisting of seven layers, two of mixed resin layer (A) consisting essentially of 65 to 85 wt% of a polyamide resin and 15 to 35 wt% of a saponified ethylene-vinyl acetate copolymer, a layer (B) containing at least 55 wt% of a saponified ethylene-vinyl acetate copolymer disposed between the two (A) layers, and two olefin resin layers disposed on the surfaces of the layers (A) interposing adhesive layers therebetween, the total thickness of both of said layers (A) being larger than that of said layer (B).

8. A heat-shrinkable laminated film according to claim 1 having a heat shrinkage of not less than 10% in both machine and transverse directions at 98° C. in hot water, said laminated film consisting of five layers including a mixed resin layer (A) consisting essentially of 65 to 85 wt% of a polyamide resin and 15 to 35 wt% of a saponified ethylene-vinyl acetate copolymer, a layer (B) containing at least 55 wt% of a saponified ethylene-vinyl acetate copolymer disposed on the surface of the layer (A) interposing an adhesive layer therebetween, and one olefin resin layer disposed on the surface of layer (B) interposing an adhesive layer therebetween, the total thickness of said layers (A) being larger than that of said layer (B).

9. A heat-shrinkable laminated film according to claim 1, wherein said layer (B) ia a layer of a saponified ethylene-vinyl acetate copolymer.

10. A heat-shrinkable laminated film according to claim 1, wherein said layer (B) is a mixed resin layer consisting essentially of not less than 55 wt% and less than 100 wt% of a saponified ethylene-vinyl acetate copolymer and more than zero but not more than 45 wt% of at least one resin selected from the group consisting of a polyester elastomer, a polyamide elastomer, a polyolefin resin, and a polyamide resin.

11. A heat-shrinkable laminated film according to claim 1, wherein the polyamide resin has a crystalline melting point of not higher than 240° C.

12. A heat-shrinkable laminated film according to claim 1, wherein the polyamide resin is nylon 6, nylon 11, nylon 12, nylon 6,9, nylon 6,10, nylon 6,12, nylon 6-12 or nylon 6-66.

13. A heat-shrinkable laminated film according to claim 1, wherein the ethylene content of the saponified ethylene-vinyl acetate copolymer is 25 to 49% and the degree of saponification of the saponified ethylene-vinyl acetate copolymer is not less than 95mol%.

14. A heat-shrinkable laminated film according to claim 1, wherein the total thickness of the (A) layer of layers is 1.2 to 3 times as large as that of layer (B).

15. A heat-shrinkable laminated film according to claim 1, wherein the total thickness of layer (A) and layer (B) is not more than 30 m and has a thickness in which the gas permeability is not more than 150 cc/m$^2$·day·atm.

16. A heat-shrinkable laminated film according to any one of claims 3, 4, 6 or 7, wherein said olefin resin is a copolymer of ethylene and a vinyl ester monomer; a copolymer of ethylene and a monomer selected from the group consisting of an aliphatic unsaturated carboxylic acid and an aliphatic unsaturated carboxylate; a copolymer of ethylene and a monomer selected from the group consisting of acrylic acid, acrylate, methacrylic acid and methacrylate; an ionomer resin; a mixed resin of a linear low-density polyethylene and a copolymer of ethylene and a mixed resin of a very low-density polyethylene and a minor amount of a linear low-density polyethylene.

17. A heat-shrinkable laminated film according to any one of claims 3, 4, 6 or 7, wherein said adhesive layer is a polyolefin modified by or polymerized with a carboxylic acid.

18. A process for producing a heat-shrinkable laminated film comprising the steps of:
(1) coextruding at least two layers of a mixed resin layer (A), consisting essentially of 65 to 85 wt% of a polyamide resin and 15 to 35 wt% of a saponified ethylene-vinyl acetate copolymer, and a layer (B), containing at least 55 wt% of a saponified ethylene-vinyl acetate copolymer, from a circular die and coextruding the laminate into a tubular shape, provided the thickness of said layer (A) is larger than that of said layer (B); and
(2) biaxially stretching the tubular laminate produced in step (1)-to 1.3 to 3.5 times in the machine and transverse directions, respectively, while heating said laminate to at least 75° C. but not more than 100° C.

* * * * *